(12) United States Patent
Petrillo et al.

(10) Patent No.: US 10,634,005 B2
(45) Date of Patent: Apr. 28, 2020

(54) FLOW METERING AND RETENTION SYSTEM

(71) Applicant: United Technologies Corporation, Farmington, CT (US)

(72) Inventors: Dalton C. Petrillo, Norwich, CT (US); Christopher M. Juh, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 518 days.

(21) Appl. No.: 15/649,387

(22) Filed: Jul. 13, 2017

(65) Prior Publication Data
US 2019/0017412 A1    Jan. 17, 2019

(51) Int. Cl.
*F01D 25/08* (2006.01)
*F01D 5/30* (2006.01)
(Continued)

(52) U.S. Cl.
CPC ............ *F01D 25/08* (2013.01); *F01D 5/082* (2013.01); *F01D 5/3015* (2013.01); *F01D 11/001* (2013.01); *F01D 11/16* (2013.01); *F01D 25/24* (2013.01); *F02C 3/067* (2013.01); *F02C 7/18* (2013.01); *F02C 7/28* (2013.01); *F01D 11/00* (2013.01); *F02C 7/00* (2013.01); *F05D 2220/321* (2013.01); *F05D 2230/642* (2013.01);
(Continued)

(58) Field of Classification Search
CPC ........ F01D 25/08; F01D 5/3015; F01D 5/082; F01D 11/001; F01D 25/24; F01D 11/16; F01D 11/00; F02C 7/18; F02C 3/067; F02C 7/28; F02C 7/00; F05D 2260/33; F05D 2230/644; F05D 2260/38; F05D 2260/36; F05D 2230/642; F05D 2220/321; F05D 2250/44; F05D 2230/90
See application file for complete search history.

(56) References Cited

U.S. PATENT DOCUMENTS 4,805,398 A * 2/1989 Jourdain ................. F01D 5/082
236/93 R
5,222,742 A * 6/1993 Roberts ................... F01D 11/02
277/420
(Continued)

OTHER PUBLICATIONS

Extended European Search Report for EP Application No. 18171390.0, dated Apr. 25, 2019, pp. 9.

*Primary Examiner* — Hung Q Nguyen
*Assistant Examiner* — Brian P Monahon
(74) *Attorney, Agent, or Firm* — Kinney & Lange, P.A.

(57) ABSTRACT

A flow metering and retention system includes a first disk that is annular in shape surrounding a centerline and extending axially along the centerline, a first coverplate axially rearward of the first disk with the first coverplate having an axially rearward extending arm, a second disk that is annular in shape surrounding the centerline and rearward of the first coverplate, a second coverplate at least partially between the first coverplate and the second disk; and a ring adjacent to the radially outer side of the slot of the second disk. The second disk has a slot into which the arm of the first coverplate extends with the slot having a radially outer side and a radially inner side, and the ring is configured to meter air flowing between the radially outer side of the slot and the arm of the first coverplate.

20 Claims, 4 Drawing Sheets

(51) Int. Cl.

| | | |
|---|---|---|
| *F02C 3/06* | (2006.01) | |
| *F02C 7/18* | (2006.01) | |
| *F01D 11/00* | (2006.01) | |
| *F01D 5/08* | (2006.01) | |
| *F01D 11/16* | (2006.01) | |
| *F01D 25/24* | (2006.01) | |
| *F02C 7/28* | (2006.01) | |
| *F02C 7/00* | (2006.01) | |
| *F02C 3/067* | (2006.01) | |

(52) U.S. Cl.
CPC .... *F05D 2230/644* (2013.01); *F05D 2230/90* (2013.01); *F05D 2250/44* (2013.01); *F05D 2260/33* (2013.01); *F05D 2260/36* (2013.01); *F05D 2260/38* (2013.01)

(56) References Cited

U.S. PATENT DOCUMENTS

| | | |
|---|---|---|
| 5,749,701 A | 5/1998 | Clarke et al. |
| 8,740,554 B2 | 6/2014 | Virkler et al. |
| 9,303,521 B2 | 4/2016 | Arnold |
| 9,624,784 B2 | 4/2017 | Hafner |
| 2005/0095136 A1* | 5/2005 | Broadhead ............ F01D 5/02 416/220 R |
| 2007/0116556 A1* | 5/2007 | Mons ................ F16J 15/4472 415/110 |
| 2012/0051918 A1* | 3/2012 | Glasspoole ........... F01D 5/025 416/204 A |
| 2012/0082568 A1* | 4/2012 | Tibbott ................. F01D 5/081 416/97 R |
| 2012/0177485 A1* | 7/2012 | Virkler ................ F01D 5/3015 415/173.7 |
| 2013/0264779 A1* | 10/2013 | Hafner .................... F01D 5/06 277/641 |
| 2014/0086727 A1* | 3/2014 | Xu ......................... F01D 5/082 415/116 |
| 2014/0086740 A1* | 3/2014 | Arnold ................. F01D 11/001 415/220 |
| 2015/0010393 A1* | 1/2015 | Hafner ................. F01D 11/003 415/173.7 |
| 2016/0153291 A1* | 6/2016 | Snyder ................. F01D 17/162 415/1 |
| 2016/0153302 A1 | 6/2016 | Samudrala et al. |
| 2016/0298481 A1 | 10/2016 | Gambardella et al. |
| 2017/0051621 A1* | 2/2017 | Ackermann ........... F01D 5/087 |

* cited by examiner

US 10,634,005 B2

FLOW METERING AND RETENTION SYSTEM

STATEMENT OF GOVERNMENT INTEREST

This invention was made with government support under W58RGZ-16-C-0046 awarded by the United States Army. The government has certain rights in the invention.

BACKGROUND

The present invention relates to metering cooling air in a gas turbine engine, and in particular, to the use of a ring to meter cooling air and retain components in a gas turbine engine.

In general, gas turbine engines combust a mixture of compressed air and fuel to produce hot combustion gases. The combustion gases may flow through one or more turbine stages to generate power for a load and/or compressor. The combination of hot gases and high pressures can cause stress and wear of components in the turbine. To reduce the stress and wear, cooling air flows through parts of the turbine, such as the interturbine area between the turbine disks. Between the turbine disks, high pressure of the cooling air may need to be maintained in order to provide increased cooling capabilities. To maintain a high pressure, the cooling air can be metered. Further, each turbine disk may include a coverplate adjacent to and connected to a side of a respective turbine disk. While various devices can be used to connect the coverplates to the turbine disk, limitations in the space within the interturbine area makes metering of the cooling air and retention of the coverplate adjacent to the turbine disk difficult.

SUMMARY

A system for a gas turbine engine includes a high pressure turbine disk, a high pressure turbine coverplate, and low pressure turbine disk, a low pressure turbine coverplate, an interface between the low pressure turbine disk and the low pressure turbine coverplate, and a ring. The high pressure turbine coverplate is axially rearward of the high pressure turbine disk and has an arm that extends axially rearward. The low pressure turbine disk is axially rearward of the high pressure turbine coverplate and has a slot into which the arm of the high pressure turbine coverplate extends. The low pressure turbine coverplate is at least partially between the high pressure turbine coverplate and the low pressure turbine disk. The interface is radially outward from the arm of the high pressure turbine coverplate and has a groove. The ring is within the groove at the interface and extending radially inward towards the arm of the high pressure turbine coverplate with the ring being configured to prevent axial movement of the low pressure turbine coverplate relative to the low pressure turbine and to form a first metering point to meter air flowing between the high pressure turbine coverplate and the low pressure turbine disk.

A flow metering and retention system includes a first disk that is annular in shape surrounding a centerline and extending axially along the centerline, a first coverplate axially rearward of the first disk with the first coverplate having an axially rearward extending arm, a second disk that is annular in shape surrounding the centerline and rearward of the first coverplate, a second coverplate at least partially between the first coverplate and the second disk; and a ring adjacent to the radially outer side of the slot of the second disk. The second disk has a slot into which the arm of the first coverplate extends with the slot having a radially outer side and a radially inner side, and the ring is configured to meter air flowing between the radially outer side of the slot and the arm of the first coverplate.

DETAILED DESCRIPTION

A flow metering and retention system in an interturbine area of a gas turbine engine is disclosed herein. The flow metering and retention system includes a slot in a low pressure turbine ("LPT") disk and an arm on a high pressure turbine ("HPT") coverplate that extends into the slot. On a radially outer side of the slot is a ring that can be positioned within a groove in interlocking teeth on the LPT disk and an LPT coverplate. The ring and the placement of the ring relative to the arm of the HPT coverplate provides at least three functions in the flow metering and retention system. First, the ring within the groove in the teeth of the LPT disk and LPT coverplate provides axial retention of the LPT disk and LPT coverplate to ensure the two components remain adjacent to one another. The teeth of the LPT disk and LPT coverplate are circumferentially alternating, providing circumferential retention of the LPT disk and LPT coverplate to ensure the two components rotate in unison, and the LPT disk is at least partially radially within the LPT coverplate, providing radial retention to ensure the two components remain radially adjacent to one another. Thus, the ring and surrounding components ensure that the LPT coverplate is retained in relation to the LPT disk. Second, the ring extends radially inward into a gap between the radially outer side of the slot and the arm of the HPT coverplate. The inward extending ring creates a first metering point of cooling air flowing within the interturbine area to ensure the pressure of that cooling air within the interturbine area remains elevated to provide sufficient cooling to the LPT disk, the LPT coverplate, and the other components within the interturbine area. Third, the ring acts as a buffer between the rotating LPT disk and the nonrotating or oppositely rotating HPT coverplate to prevent the two components from contacting one another and becoming damaged. While this disclosure discusses the flow metering and retention system as being located between two rotating components rotating in an opposite direction from one another, other embodiments of the flow metering and retention system can be utilized with one or both components being static/nonrotating.

Figure 1:
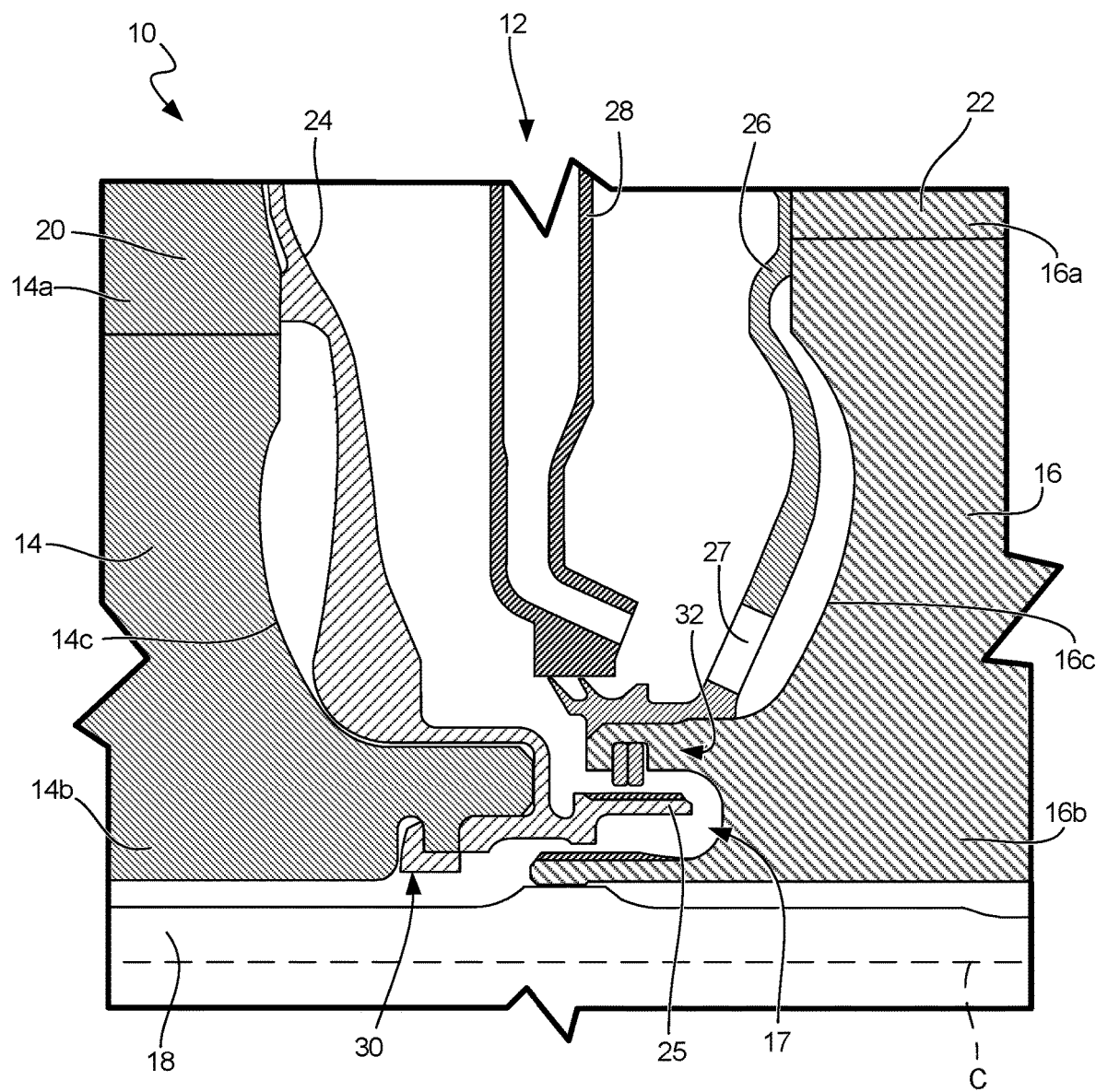
FIG. 1 is a cross-sectional view of an interturbine area of a gas turbine engine.

FIG. 1 is a cross-sectional view of an interturbine area of a gas turbine engine. Gas turbine engine 10 includes interturbine area 12 between high pressure turbine disk 14 and low pressure turbine disk 16. Interturbine area 12, HPT disk 14, and LPT disk 16 are radially outward from shaft 18, which extends along an axial centerline C of gas turbine engine 10. HPT disk 14 includes radially outer side 14a, radially inner side 14b, an axially forward side (not shown), and axially rearward side 14c with HPT blades 20 on radially outer side 14a. LPT disk 16 includes radially outer side 16a, radially inner side 16b, axially forward side 16c, and an axially rearward side (not shown) with slot 17 on axially forward side 16c and LPT blades 22 on radially outer side 16a. Interturbine area 12 includes HPT coverplate 24 (with arm 25), LPT coverplate 26 (with at least one cooling air hole 27), and tube 28. HPT disk 14 and HPT coverplate 24 interact with one another at HPT interface 30, while LPT disk 16 and LPT coverplate 26 interact with one another at LPT interface 32.

Although the disclosed non-limiting embodiment depicts a gas turbine engine, it should be understood that the concepts described herein are not limited to use with gas turbine engines as the teachings may be applied to other types of machines. Further, while this disclosure details the use of a flow metering and retention system between a HPT disk and a LPT disk, the configuration described herein can be utilized in other sections of the gas turbine engine. It should be further understood that the disclosed non-limiting embodiment provides generally a flow metering and retention system that is suitable for many types of rotating or rotary machines as known to those of ordinary skill in the art.

Shaft 18 extends along centerline C of gas turbine engine 10 and rotates to transmit power between various components of gas turbine engine 10. Shaft 18 can be a low speed shaft/spool, a high speed shaft/spool, or another configuration. However, as shown in the disclosed embodiment, shaft 18 is adjacent to and interlocks with radially inner side 16b of LPT disk 16, so shaft 18 is a low speed shaft. Shaft 18 can interlock with LPT disk 16 through radially extending fingers that interact with features on radially inner side 16b of LPT disk 16 to force shaft 18 to rotate in unison with LPT disk 16 to transfer power along shaft 18 (or vice-versa).

HPT disk 14 is an annular turbine disk that surrounds and is radially outward from shaft 18. HPT disk 14 is axially forward from LPT disk 16. HPT disk 14 is not connected to shaft 18 and does not rotate in unison with shaft 18 and LPT disk 16. Rather, HPT disk 14 is configured to rotate either in an opposite direction to shaft 18 and LPT disk 16 or at a speed that is different than a speed of rotation of shaft 18 and LPT disk 16 (including HPT disk 14 being nonrotating while LPT disk 16 and shaft 18 rotating in unison). HPT disk 14 includes HPT blades 20 on radially outer side 14a that extract power from a gas flowing through a gas path within gas turbine engine 10. While not shown in FIG. 1, HPT disk 14 can be connected to a high speed shaft or another component at radially inner side 14b near the axially forward side of HPT disk 14 or another location to transfer power to other components of gas turbine engine 10. HPT disk 14 has axially rearward side 14c that forms an axially forward boundary of interturbine area 12. HPT disk 14 also includes the axially forward side that is not shown in FIG. 1 but can be similar in configuration to axially rearward side 14c. HPT disk 14 can have a cross section that is generally thicker (i.e., extends a longer distance in the axial direction) near radially inner side 14b than near radially outer side 14a. However, HPT disk 14 as shown has a cross section that curves axially forward along axially rearward side 14c. At radially outer side 14a, HPT disk 14 can include features that allow for the attachment of HPT blades 20 to HPT disk 14.

On radially inner side 14b near axially rearward side 14c, HPT disk 14 includes teeth that extend radially inward at HPT interface 30 to interlock with teeth of HPT coverplate 24 to retain HPT coverplate 24 adjacent to axially rearward side 14c of HPT disk 14 (i.e., to prevent movement of HPT coverplate 24 relative to HPT disk 14). During operation, HPT disk 14 can experience elevated temperatures due to the rotation of HPT disk 14 and other factors. HPT disk 14 can include other features and configurations not shown or explicitly discussed in this disclosure.

Adjacent to axially rearward side 14c of HPT disk 14 is HPT coverplate 24, which extends radially from radially outer side 14a of HPT disk 14 (adjacent HPT blades 20) to HPT interface 30. HPT coverplate 24 can include teeth that interlock with HPT disk 14 (i.e., the teeth of HPT disk 14) at HPT interface 20 so that HPT coverplate 24 rotates in unison with HPT disk 14 and does not move independently from HPT disk 14. HPT coverplate 24 can include sealing features, such as feather seals, to help seal the rotating HPT coverplate 24 with nonrotating (or oppositely rotating) tube 28 and/or other components of gas turbine engine 10. HPT coverplate 24 includes arm 25, which extends axially rearward towards LPT disk 16.

Arm 25 is at radially inner end of HPT coverplate 24 and extends axially rearward into slot 17 in LPT disk 16. Arm 25 and slot 17 form a portion of the flow metering and retention system that will be discussed with regards to FIGS. 2A, 2B, and 3. HPT coverplate 24 can include other features and configurations not shown or explicitly discussed in this disclosure.

LPT disk 16 is an annular turbine disk that surrounds and is radially outward from shaft 18. LPT disk 16 is axially rearward from HPT disk 14, and LPT disk 16 is configured to rotate in unison with shaft 18 and transfer power to other components of gas turbine engine 10. LPT disk 16 includes LPT blades 22 on radially outer side 16a that extract power from a gas flowing through a gas path within gas turbine engine 10. As mentioned above, LPT disk 16 interlocks with shaft 18 at radially inner side 16b. LPT disk 16 has axially forward side 16c that forms an axially rearward boundary of interturbine area 12. LPT disk 16 also includes the axially rearward side that is not shown in FIG. 1 but can be similar in configuration to axially forward side 16c. LPT disk 16 can have a cross section that is generally thicker (i.e., extends a longer distance in the axial direction) near radially inner side 16b than near radially outer side 16a. However, LPT disk 16 as shown has a cross section that curves axially rearward along axially forward side 16c. At radially outer side 16a, LPT disk 16 can include features that allow for the attachment of LPT blades 22 to LPT disk 16.

On axially rearward side 16c near radially inner side 16b, LPT disk 16 includes teeth that extend axially forward at LPT interface 32 to interlock with teeth of LPT coverplate 26 (as will be discussed with regards to FIGS. 2A, 2B, and 3). The LPT disk 16 teeth can also include a feature, such as a groove, configured to accommodate a ring, such as a spiral ring seal. Additionally, at the intersection of radially inner side 16b and axially forward side 16c is an axially forward extending member (which can include features that interact and interlock with shaft 18 on radially inner side 16b). This member, along with LPT interface 32, form slot 17 into which arm 25 of HPT coverplate 24 extends. During operation, LPT disk 16 can experience elevated temperatures due to the rotation of LPT disk 16 and other factors. LPT disk 16 can include other features and configurations not shown or explicitly discussed in this disclosure.

Adjacent to axially forward side 16c of LPT disk 16 is LPT coverplate 26, which extends radially from radially outer side 16a of LPT disk 16 (adjacent LPT blades 22) to LPT interface 32. LPT coverplate 26 can include teeth that interlock with LPT disk 16 (i.e., the teeth of LPT disk 16) at LPT interface 32 so that LPT coverplate 26 rotates in unison with LPT disk 16 and shaft 18. The LPT coverplate 26 teeth can also include a feature, such as a groove, configured to accommodate a ring, such as a spiral ring seal. LPT coverplate 26 can include sealing features, such as feather seals, to help seal the rotating LPT coverplate 26 with nonrotating (or oppositely rotating) tube 28 and/or other components of gas turbine engine 10. Further, LPT coverplate 26 can include at least one cooling air hole 27 that is configured to allow cooling air (or another fluid) to access/reach LPT disk 16 to cool LPT disk 16. LPT coverplate 26 can include other features and configurations not shown or explicitly discussed in this disclosure.

Tube 28 is within interturbine area 12 and is positioned between HPT coverplate 24 and LPT coverplate 26. Tube 28 is not annular, and interturbine area 12 and gas turbine engine 10 can include multiple tubes 28 spaced circumferentially around annular interturbine area 12. Tube 28 is configured to provide cooling air to interturbine area 12 and, more specifically, to LPT coverplate 26 and LPT disk 16. Tube 28 can be rotating or nonrotating, and can have curves, angles, or other configurations to convey cooling air from a cool air source to interturbine area 12. Tube 28 can include other features, such as sealing surfaces and seals. Interturbine area 12 can also include a configuration in which tube 28 is not present and cooling air is conveyed to interturbine area 12 another way. Further, tube 28 can include other features and configurations not shown or explicitly discussed in this disclosure.

Figure 2A:
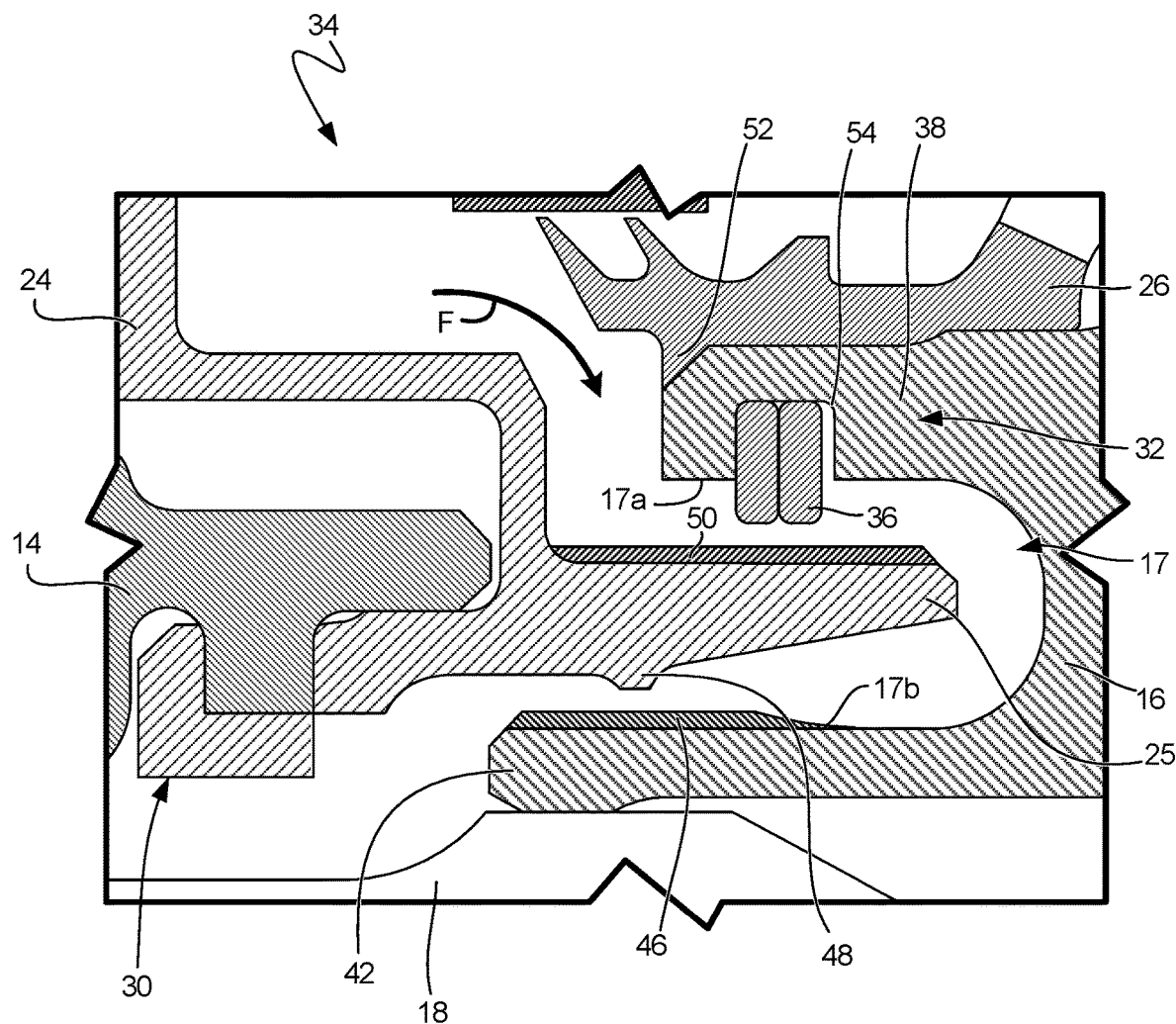
FIG. 2A is an enlarged cross-sectional view of a flow metering and retention system in the interturbine area of the gas turbine engine.
Figure 2B:
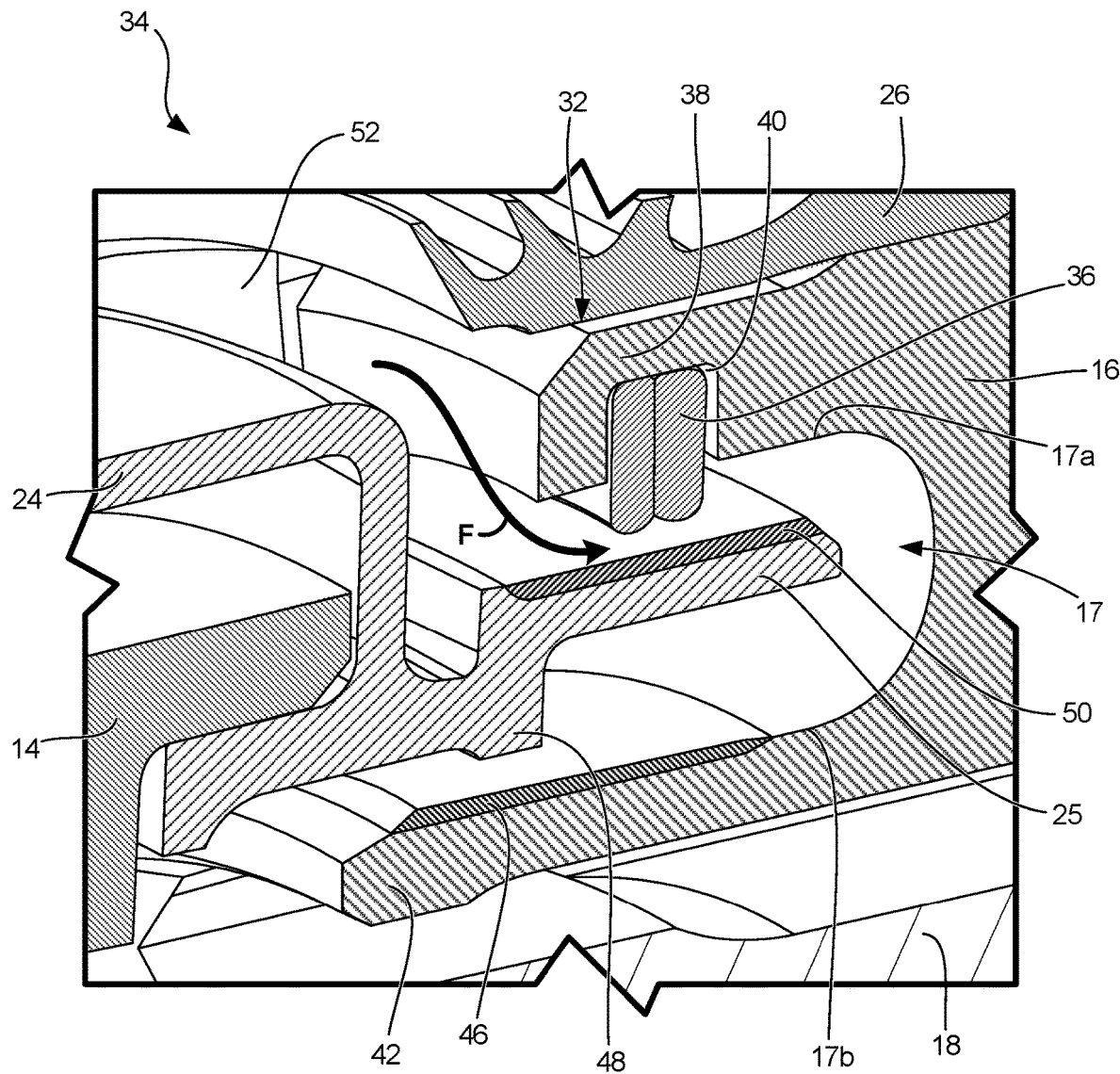
FIG. 2B is a first cross-sectional perspective view of the flow metering and retention system.
Figure 3:
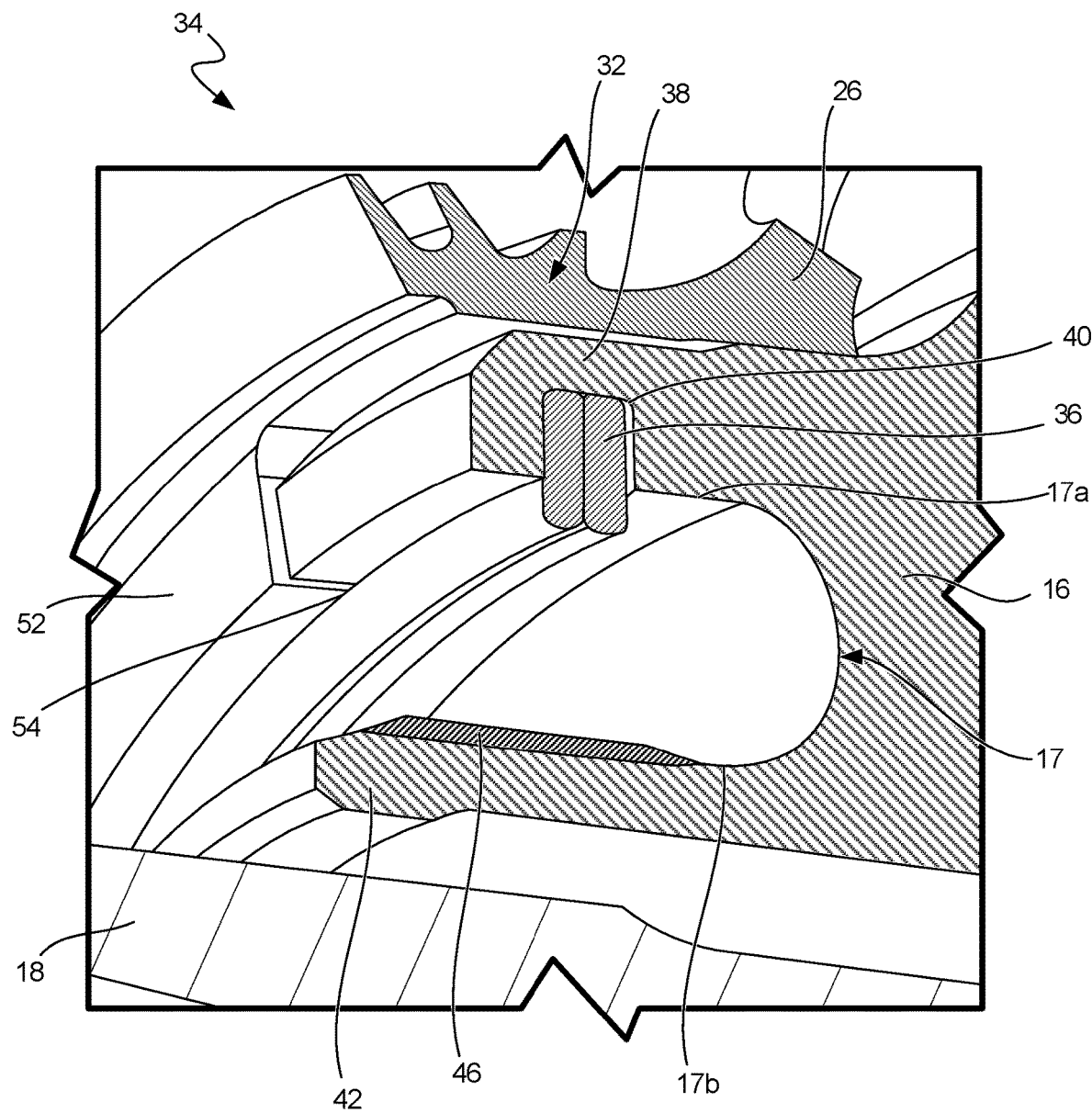
FIG. 3 is a second cross-sectional perspective view of the flow metering and retention system.

FIG. 2A is an enlarged cross-sectional view of a flow metering and retention system in interturbine area 12 of gas turbine engine 10, FIG. 2B is a first cross-sectional perspective view of the flow metering and retention system, and FIG. 3 is a second cross-sectional perspective view of the flow metering and retention system without showing HPT coverplate 24.

Flow metering and retention system 34 includes LPT disk 16, LPT coverplate 26, HPT coverplate 24, and ring 36. LPT disk 16 includes LPT disk teeth 38 and LPT disk teeth groove 40 (shown in FIGS. 2B and 3) at LPT interface 32, member 42, slot 17 with radially outer side 17a formed by LPT interface 32 and radially inner side 17b formed by member 42, and LPT disk wear surface 46. HPT coverplate 24 includes arm 25, which has rib 48 and HPT coverplate wear surface 50. LPT coverplate 26 includes LPT coverplate teeth 52 and LPT coverplate teeth groove 54 (shown in FIGS. 2B and 3) at LPT interface 32. Also shown in FIGS. 2A, 2B, and 3 are HPT disk 14 and shaft 18. Cooling air flow F flows through slot 17 between HPT coverplate 24 and LPT disk 16.

Ring 36 is at LPT interface 32, which is the location at which LPT disk 16 and LPT coverplate 26 interact. Ring 36 has an annular shape that can be constructed from any material. Ring 36 can be a spiral ring, a split ring, or another type of annular member. However, ring 36 should have sufficient structural integrity and rigidity to hold LPT disk teeth 38 and LPT coverplate teeth 52 adjacent to one another and ensure the two components remain interlocked. As shown in the disclosed embodiment, ring 36 is a spiral ring with two annular loops/spirals. Ring 36 can include other features and configurations not shown or explicitly discussed in this disclosure.

As most easily seen in FIG. 3, LPT disk 16 includes LPT disk teeth 38 that extend axially forward and circumferentially alternate with LPT coverplate teeth 52. LPT disk teeth 38 can include any number of individual teeth that alternate with LTP coverplate teeth 52 to extend circumferentially around the annular LPT disk 16 at LPT interface 32. LPT disk teeth 38 can extend axially any length, with individual teeth being able to extend axially an equal length or a different length than adjacent LPT disk teeth 38 and/or LPT coverplate teeth 52 (with LPT coverplate teeth 52 between LPT disk teeth 38). LPT disk teeth 38 can extend axially a sufficient length to allow for LPT disk teeth groove 40 and ring 36 therein.

LPT coverplate 26 includes LPT coverplate teeth 52 that extend radially inward from LPT coverplate 26 and circumferentially alternate with LPT disk teeth 38. As with LPT disk teeth 38, LPT coverplate teeth 52 can include any number of individual teeth that alternate with LPT disk teeth 38 to extend circumferentially around the annular LPT coverplate 26 at LPT interface 32. LPT coverplate teeth 52 can extend radially inward any distance, but as shown in the disclosed embodiment the LPT coverplate teeth 52 extend inward a distance approximately equal to the radial thickness of LPT disk teeth 38. Further, the LPT coverplate teeth 52 can have any axial length, with individual teeth being able to extend axially an equal length or a different length than adjacent LPT coverplate teeth 52 and/or LPT disk teeth 38 (with LPT disk teeth 38 between LPT coverplate teeth 52). LPT coverplate teeth 52 can extend axially a sufficient length to allow for LPT coverplate teeth groove 54 and ring 36 therein.

LPT disk teeth 38 can include LPT disk teeth groove 40, and LPT coverplate teeth 52 can include LPT coverplate teeth groove 54. LPT disk teeth groove 40 and LPT coverplate teeth groove 54 extend radially and are configured to form one circumferentially continuous groove at LPT interface 32 to house at least a portion of ring 36. The one continuous groove formed by LPT disk teeth groove 40 and LPT coverplate teeth groove 54 can have any radial depth suitable to house all or a portion of ring 36, and can have any axial length configured to allow ring 36 to fit within. Ring 36 can be held within the one continuous groove formed by LPT disk teeth groove 40 and LPT coverplate teeth groove 54 by a fastener or some other retaining means, including adhesive or friction by being sized to be squeezed within the groove. LPT disk teeth 38, LPT disk teeth groove 40, LPT coverplate teeth 52, and LPT coverplate teeth groove 54 can include other features and configurations not shown or explicitly discussed in this disclosure.

Ring 36 is in position within the one continuous groove formed by LPT disk teeth groove 40 and LPT coverplate teeth groove 54 to extend entirely circumferentially around LPT interface 32 and adjacent to LPT disk teeth 38 and LPT coverplate teeth 52. Ring 36 positioned within the groove is configured to prevent axial movement of LPT disk 16 relative to LPT coverplate 26 to retain the two components axially adjacent to one another. Further, with LPT disk teeth 38 and LPT coverplate teeth 52 alternating in a circumferential direction, LPT disk 16 and LPT coverplate 26 are prevented from circumferential movement relative to one another. And with LPT disk 16 being at least partially radially inward from LPT coverplate 26, LPT disk 16 and LPT coverplate 26 are also prevented from radial movement relative to one another. Thus, flow metering and retention system 34 is configured to prevent movement (i.e., retain) of LPT disk 16 relative to LPT coverplate 26 along three degrees of freedom.

Another feature of flow metering and retention system 34 is provided by the configuration of ring 36 in relation to arm 25 of HPT coverplate 24 and slot 17 of LPT disk 16. Arm 25 extends axially rearward from HPT coverplate 24 into slot 17 on axially forward side 16c of LPT disk 16. Arm 25 is annular in shape with a cross section that can have a flat radially outer side adjacent to ring 36 and radially outer side of slot 17, with HPT coverplate wear surface 50 being located on the flat radially outer side of arm 25. HPT coverplate wear surface 50 can be a coating or another component/configuration that protects arm 25 from becoming damaged if ring 36 were to contact arm 25. On a radially inner side of arm 25 is rib 48, which is a radially inward extending flange that extends circumferentially around annular arm 25. Rib 48 on arm 25 is adjacent to and radially outward from radially inner side 17b of slot 17.

Slot 17 is annular in shape and is a U-shaped cross-sectional opening in axially rearward side near radially inner side 16b of LPT disk 16. Slot 17 has radially outer side 17a formed by LPT disk teeth 38 (and LPT coverplate teeth 52) that is adjacent to and radially outward from the flat radially outer side of arm 25. Radially inner side 17b of slot 17 is formed by member 42 of LPT disk 16 that is adjacent to and radially inward from rib 48. Slot 17 provides an opening into which arm 25 of HPT coverplate 24 extends, with cooling air flow F flowing through a gap between slot 17 and arm 25. On radially inner side 17b of slot 17 is LPT disk wear surface 46, which can be a coating or another component/configuration that protects rib 48 of arm 25 from becoming damaged if arm 25 of HPT coverplate 24 were to contact radially inner side 17b of slot 17.

With ring 36 extending radially inward from LPT disk teeth 38 and LPT coverplate teeth 52 toward arm 25, a first metering point is formed to meter cooling air flow F flowing between LPT disk 16 and HPT coverplate 24. The first metering point is a choke point of reduced cross-sectional flow area along the flow path of cooling air flow F from tube 28 to shaft 18. The first metering point ensures that the cooling air within interturbine area 12 remains at an increased pressure to better provide cooling capacity to LPT disk 16, LPT coverplate 26, and the other components within interturbine area 12. With rib 48 extending radially inward from arm 25 towards radially inner side 17b, a second metering point is formed to meter cooling air flow F flowing between LPT disk 16 and HPT coverplate 24. Like the first metering point, the second metering point is a choke point of reduced cross-sectional flow area along the flow path of cooling air flow F from tube 28 to shaft 18. The second metering point works in conjunction with the first metering point to ensure that the cooling air within interturbine area 12 remains at an increased pressure.

Flow metering and retention system 34 having two metering points creates redundancy and ensures that a choke point is present along the flow path of cooling air flow F even when HPT coverplate 24 (and arm 25) move radially with regards to LPT disk 16 (and slot 17). During a situation in which HPT coverplate 24 moves radially outward relative to LPT disk 16, a gap between ring 36 and arm 25 narrows, causing the choke point to be at the first metering point and causing a gap between rib 48 and radially inner side 17b of slot 17 to widen. Thus, the first metering point functions to meter cooling air flow F and ensures the pressure of cooling air within interturbine area 12 remains increased. During a situation in which HPT coverplate 24 moves radially inward relative to LPT disk 16, the gap between ring 36 and arm 25 widens, but the gap between rib 48 and radially inner side 17b of slot 17 narrows, causing the choke point to be at the second metering point. Thus, the second metering point functions to meter cooling air flow F and ensures the pressure of cooling air within interturbine area 12 remains increased. If no radial movement of HPT coverplate 24 (and/or HPT disk 14) relative to LPT disk 16 can occur within gas turbine engine 10, than a flow metering and retention system 34 with two metering points may not be needed and only one metering point may be necessary.

Ring 36 forming the first metering point also provides a buffer between LPT disk 16 and HPT coverplate 24 to prevent damage to either component if LPT disk 16 and HPT coverplate 24 were to contact one another. During such a situation, ring 36 (which can be made from a softer, less expensive material than LPT disk 16 and HPT coverplate 24) would function as a sacrificial component that would take on the resultant wear so that LTP disk 16 and HPT coverplate 24 would not become damaged. The wear is a result of the contact between two oppositely rotating components (or two components that are rotating at different speeds and/or one component being nonrotating). With ring 36 being smaller and less expensive to replace than LPT disk 16 and HPT coverplate 24, if any component is to become damaged during operation, damage to ring 36 is more desirable than damage to LPT disk 16 and HPT coverplate 24.

As discussed above, the configuration of ring 36 and the other components provides at least three functions in flow metering and retention system 34. First, ring 36 within LPT disk teeth groove 40 and LPT coverplate teeth groove 54 provides axial retention of LPT disk 16 and LPT coverplate 26 to ensure the two components remain adjacent to one another. The circumferential alternating teeth of LPT disk teeth 38 and LPT coverplate teeth 52 provide circumferential retention of LPT disk 16 and LPT coverplate 26 to ensure the two component rotate in unison, while the configuration in which at least a portion of LPT disk 16 is radially within LPT coverplate 26 provides radial retention to ensure the two components remain radially adjacent to one another. Thus, ring 36 aids in ensuring that LPT coverplate 26 is retained in relation to LPT disk 16. Second, ring 36 extends radially inward into the flow path of cooling air flow F flowing between LPT disk 16 and HPT coverplate 24 to provide the first metering point to ensure the pressure of cooling air flow F within interturbine area 12 remains elevated to provide sufficient cooling to LPT disk 16, LPT coverplate 26, and the other components within interturbine area 12. Third, ring 36 acts as a buffer between LPT disk 16 and arm 25 of HPT coverplate 24 to prevent the two components from contacting one another and causing damage to one another. Thus, with ring 36 having multiple functions within flow metering and retention system 34, interturbine area 12 of gas turbine engine 10 can be more efficient and compact, resulting in gas turbine engine 10 that is lighter and more efficient.

Discussion of Possible Embodiments

The following are non-exclusive descriptions of possible embodiments of the present invention.

A system for a gas turbine engine includes a high pressure turbine disk, a high pressure turbine coverplate, and low pressure turbine disk, a low pressure turbine coverplate, an interface between the low pressure turbine disk and the low pressure turbine coverplate, and a ring. The high pressure turbine coverplate is axially rearward of the high pressure turbine disk and has an arm that extends axially rearward. The low pressure turbine disk is axially rearward of the high pressure turbine coverplate and has a slot into which the arm of the high pressure turbine coverplate extends. The low pressure turbine coverplate is at least partially between the high pressure turbine coverplate and the low pressure turbine disk. The interface is radially outward from the arm of the high pressure turbine coverplate and has a groove. The ring is within the groove at the interface and extending radially inward towards the arm of the high pressure turbine coverplate with the ring being configured to prevent axial movement of the low pressure turbine coverplate relative to the low pressure turbine and to form a first metering point to meter air flowing between the high pressure turbine coverplate and the low pressure turbine disk.

The system of the preceding paragraph can optionally include, additionally and/or alternatively, any one or more of the following features, configurations and/or additional components:

The interface includes low pressure turbine disk teeth and low pressure turbine coverplate teeth that alternate and interlock in a circumferential direction, each of the low pressure turbine disk teeth and the low pressure turbine coverplate teeth include the groove with the ring positioned within the groove to prevent movement of the low pressure turbine disk teeth relative to the low pressure turbine coverplate teeth.

The ring is at least one spiral ring that is annular in shape.

The arm of the high pressure turbine coverplate includes a radially inward extending rib configured to form a second metering point to meter air flowing between the high pressure turbine coverplate and the low pressure turbine disk.

The rib meters the air flowing between the high pressure turbine coverplate and the low pressure turbine disk to cause air adjacent to the low pressure turbine coverplate to be at a greater pressure than air downstream from the rib.

The low pressure turbine disk and the low pressure turbine coverplate are rotatable in a direction that is opposite a direction of rotation of the high pressure turbine disk and the high pressure turbine coverplate.

A shaft radially inward from the high pressure turbine disk and the low pressure turbine disk, wherein the low pressure turbine disk and the shaft interlock such that the low pressure turbine disk, the low pressure turbine coverplate, and the shaft are rotatable in unison.

The ring provides a buffer to prevent the arm of the high pressure turbine coverplate from contacting the low pressure turbine disk.

The low pressure turbine coverplate includes at least one cooling air hole configured to allow cooling air to reach the low pressure turbine disk.

The ring meters the air flowing between the high pressure turbine coverplate and the low pressure turbine disk to cause air adjacent to the low pressure turbine coverplate to be at a greater pressure than air downstream from the ring.

A flow metering and retention system includes a first disk that is annular in shape surrounding a centerline and extending axially along the centerline, a first coverplate axially rearward of the first disk with the first coverplate having an axially rearward extending arm, a second disk that is annular in shape surrounding the centerline and rearward of the first coverplate, a second coverplate at least partially between the first coverplate and the second disk; and a ring adjacent to the radially outer side of the slot of the second disk. The second disk has a slot into which the arm of the first coverplate extends with the slot having a radially outer side and a radially inner side, and the ring is configured to meter air flowing between the radially outer side of the slot and the arm of the first coverplate.

The flow metering and retention system of the preceding paragraph can optionally include, additionally and/or alternatively, any one or more of the following features, configurations and/or additional components:

The second disk includes a groove in the radially outer side of the slot with the ring being at least partially within the slot.

The second disk includes first teeth at the radially outer side of the slot and the second coverplate includes second teeth that are adjacent to and circumferentially alternate with the first teeth of the second disk.

The first teeth of the second disk and the second teeth of the second coverplate include an annular groove with the ring being at least partially within the groove to retain the second coverplate adjacent to the second disk.

The arm of the first coverplate includes a rib that extends radially inward to meter air flowing between the rib and the radially inner side of the slot of the second disk.

The ring is a spiral ring.

A shaft extending axially along the centerline.

The second disk is adjacent to the shaft and interlocks with the shaft to be configured to rotate in unison with the shaft.

The second coverplate includes at least one cooling air hole to allow cooling air to reach the second disk.

The first disk and the first coverplate are configured to rotate in a first direction and the second disk and the second coverplate are configured to rotate in a second direction that is opposite the first direction.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A system for a gas turbine engine extending along a centerline, the system comprising:
   a high pressure turbine disk;
   a high pressure turbine coverplate axially rearward of the high pressure turbine disk and having an arm that extends axially rearward;
   a low pressure turbine disk axially rearward of the high pressure turbine coverplate, the low pressure turbine disk having a slot into which the arm of the high pressure turbine coverplate extends;
   a low pressure turbine coverplate at least partially between the high pressure turbine coverplate and the low pressure turbine disk;
   an interface between the low pressure turbine disk and the low pressure turbine coverplate, the interface being radially outward from the arm of the high pressure turbine coverplate and having a groove; and
   a ring within the groove at the interface and extending radially inward towards the arm of the high pressure turbine coverplate, the ring being configured to prevent axial movement of the low pressure turbine coverplate relative to the low pressure turbine and to form a first metering point to meter air flowing between the high pressure turbine coverplate and the low pressure turbine disk.

2. The system of claim 1, wherein the interface includes low pressure turbine disk teeth and low pressure turbine coverplate teeth that alternate and interlock in a circumferential direction, each of the low pressure turbine disk teeth and the low pressure turbine coverplate teeth include the groove with the ring positioned within the groove to prevent movement of the low pressure turbine disk teeth relative to the low pressure turbine coverplate teeth.

3. The system of claim 1, wherein the ring is at least one spiral ring that is annular in shape.

4. The system of claim 1, wherein the arm of the high pressure turbine coverplate includes a radially inward extending rib configured to form a second metering point to meter air flowing between the high pressure turbine coverplate and the low pressure turbine disk.

5. The system of claim 4, wherein the rib meters the air flowing between the high pressure turbine coverplate and the low pressure turbine disk to cause air adjacent to the low pressure turbine coverplate to be at a greater pressure than air downstream from the rib.

6. The system of claim 1, wherein the low pressure turbine disk and the low pressure turbine coverplate are rotatable in a direction that is opposite a direction of rotation of the high pressure turbine disk and the high pressure turbine coverplate.

7. The system of claim 1, further comprising:
a shaft radially inward from the high pressure turbine disk and the low pressure turbine disk,
wherein the low pressure turbine disk and the shaft interlock such that the low pressure turbine disk, the low pressure turbine coverplate, and the shaft are rotatable in unison.

8. The system of claim 1, wherein the ring provides a buffer to prevent the arm of the high pressure turbine coverplate from contacting the low pressure turbine disk.

9. The system of claim 1, wherein the low pressure turbine coverplate includes at least one cooling air hole configured to allow cooling air to reach the low pressure turbine disk.

10. The system of claim 1, wherein the ring meters the air flowing between the high pressure turbine coverplate and the low pressure turbine disk to cause air adjacent to the low pressure turbine coverplate to be at a greater pressure than air downstream from the ring.

11. A flow metering and retention system comprising:
a first disk that is annular in shape surrounding a centerline and extending axially along the centerline;
a first coverplate axially rearward of the first disk with the first coverplate having an axially rearward extending arm;
a second disk that is annular in shape surrounding the centerline and rearward of the first coverplate, the second disk having a slot into which the arm of the first coverplate extends with the slot having a radially outer side and a radially inner side; a second coverplate at least partially between the first coverplate and the second disk; and
a ring adjacent to the radially outer side of the slot of the second disk and configured to meter air flowing between the radially outer side of the slot and the arm of the first coverplate.

12. The flow metering and retention system of claim 11, wherein the second disk includes a groove in the radially outer side of the slot with the ring being at least partially within the slot.

13. The flow metering and retention system of claim 11, wherein the second disk includes first teeth at the radially outer side of the slot and the second coverplate includes second teeth that are adjacent to and circumferentially alternate with the first teeth of the second disk.

14. The flow metering and retention system of claim 13, wherein the first teeth of the second disk and the second teeth of the second coverplate include an annular groove with the ring being at least partially within the groove to retain the second coverplate adjacent to the second disk.

15. The flow metering and retention system of claim 11, wherein the arm of the first coverplate includes a rib that extends radially inward to meter air flowing between the rib and the radially inner side of the slot of the second disk.

16. The flow metering and retention system of claim 11, wherein the ring is a spiral ring.

17. The flow metering and retention system of claim 11, further comprising:
a shaft extending axially along the centerline.

18. The flow metering and retention system of claim 17, wherein the second disk is adjacent to the shaft and interlocks with the shaft to be configured to rotate in unison with the shaft.

19. The flow metering and retention system of claim 11, wherein the second coverplate includes at least one cooling air hole to allow cooling air to reach the second disk.

20. The flow metering and retention system of claim 11, wherein the first disk and the first coverplate are configured to rotate in a first direction and the second disk and the second coverplate are configured to rotate in a second direction that is opposite the first direction.

* * * * *